United States Patent

Liskowitz

[15] 3,640,626
[45] Feb. 8, 1972

[54] MEASURING OF THE CONCENTRATION OF SOLID PARTICLES SUSPENDED IN VARIOUS REGIONS IN A FLUID USING POLARIZED LIGHT

[72] Inventor: John W. Liskowitz, Belle Meade, N.J.
[73] Assignee: American Standard, Inc., New York, N.Y.
[22] Filed: Nov. 12, 1968
[21] Appl. No.: 774,892

Related U.S. Application Data

[63] Continuation-in-part of Ser. No. 629,568, Apr. 10, 1967, abandoned.

[52] U.S. Cl. ............................356/103, 250/218, 250/225, 356/104, 356/114
[51] Int. Cl. ...................................G01n 21/00, G01n 21/40
[58] Field of Search ......................356/114–118, 102–104, 356/207–208; 250/218, 222 M, 225

[56] References Cited

UNITED STATES PATENTS

| | | | |
|---|---|---|---|
| 2,481,034 | 9/1949 | Neufeld | 250/218 X |
| 2,877,683 | 3/1959 | Fischer | 250/218 X |
| 3,146,293 | 8/1964 | Lesage | 250/218 X |
| 3,302,293 | 2/1967 | French | 356/11 X |
| 3,373,652 | 3/1968 | Flader | 356/115 X |
| 3,420,609 | 1/1969 | Kozawa | 356/104 |
| 3,450,477 | 6/1969 | Meltzer | 356/114 |

OTHER PUBLICATIONS

Weissberger, Phys. Meth of Org. Chem., U. I., Interscience Pub, N.Y. 1960 pp. 2125-2128
George et al., Phys. Rev. Ltrs., V. 11, No. 9, Nov. 1, 1963, pp. 403-406

Primary Examiner—Ronald L. Wibert
Assistant Examiner—Warren A. Sklar
Attorney—Sheldon H. Parker, Tennes I. Erstad and Robert G. Crooks

[57] ABSTRACT

The concentration of particles suspended in a fluid, having a refractive index which differs from that of the fluid, is accomplished using polarized light. The degree of depolarization of the incident light indicates the concentration of the particles in the fluid. While maintaining a constant observation angle, the distance between the light source unit and the detector unit is varied thus changing the focal point of the system. In this manner, suspended particle concentrations at varying distances from the light source and detector unit are obtained.

8 Claims, 4 Drawing Figures

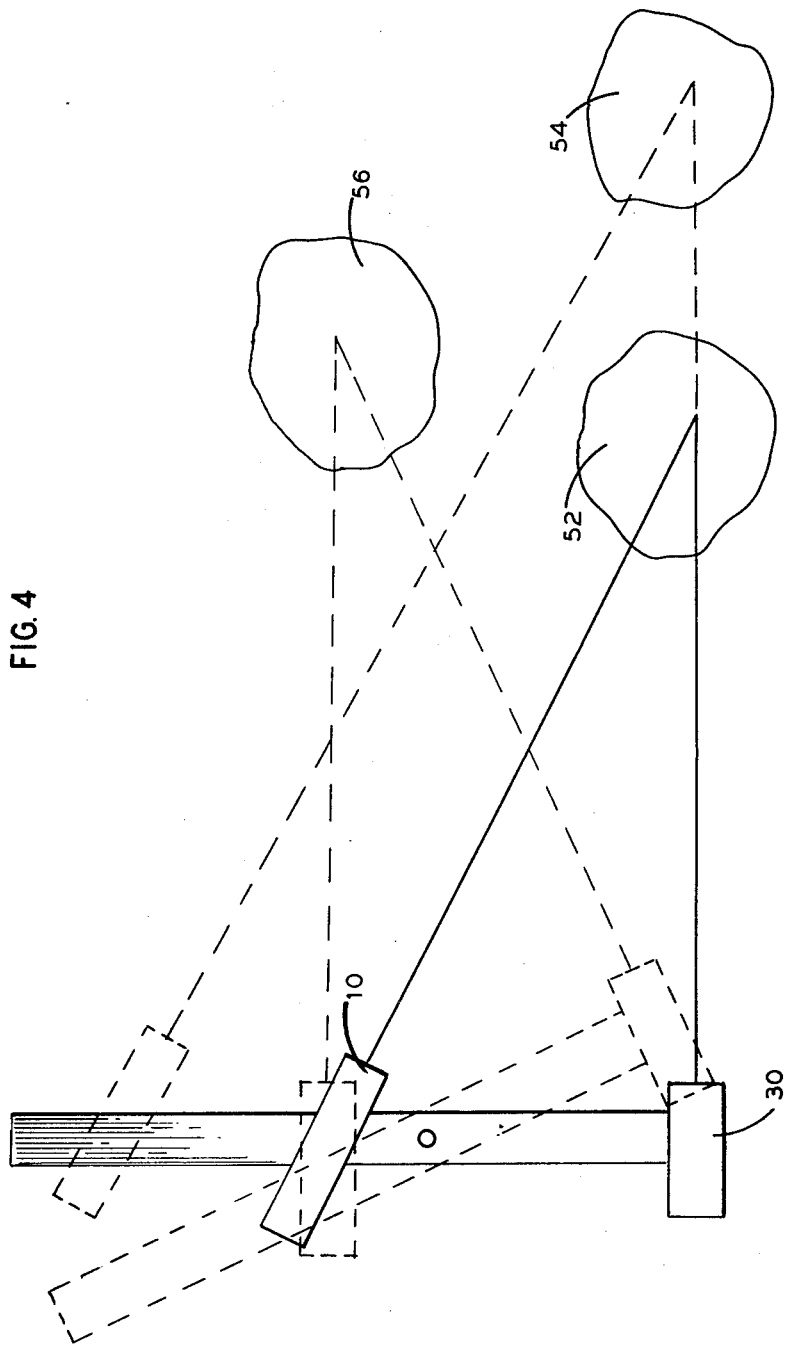

MEASURING OF THE CONCENTRATION OF SOLID PARTICLES SUSPENDED IN VARIOUS REGIONS IN A FLUID USING POLARIZED LIGHT

CROSS-REFERENCE TO RELATED APPLICATIONS

This application is a continuation-in-part of the U.S. Pat. application, Ser. No. 629,568, filed Apr. 10, 1967, now abandoned in favor of Ser. No. 775,093, filed Nov. 13, 1968.

BACKGROUND OF THE INVENTION

1. Field of the Invention

This invention relates to measuring of the concentration of particles suspended in a fluid, and more particularly, to the use of polarized light in the remote measuring of the concentration of solid particles suspended in various regions in a fluid.

2. Description of the Prior Art

The need for measuring the concentration of particles suspended in a fluid has long existed and various types of systems have been employed in attempts to satisfy the existing needs.

However, the optical systems have been found to have shortcomings such as the influence of particle size and shape as well as variations in the intensity of the light at its source, on the determinations which are being made.

Devices which requiring a sample of the system under analysis to be placed in the device, do not lend themselves to the testing of remote, or distant environments and typically necessitate the disturbing or physical probing of the system under analysis.

The physical interference with the system under analysis can not only cause changes in the system which influence adversely the readings which are being obtained but can also adversely affect the system itself.

U.S. patent applications, Ser. No. 775,093 filed Nov. 13, 1968 and 774,895 filed Nov. 12, 1968, disclose that the measuring of the depolarization of plane and circularly polarized light, can be used to determine the concentration of solids suspended in a fluid.

SUMMARY OF THE INVENTION

It has now been found that through the use of circularly or plane polarized light, remote determinations of the suspended particle concentration in a fluid can be made, in various regions of a system.

In accordance with the present invention, circularly or plane polarized light is transmitted to a particular region to be analyzed. Light which is scattered by particles suspended in the region under analysis is analyzed with respect to its various components. For example, the ratio of polarized light to depolarized light can be measured. The light source is then moved with respect to its distance from detector unit, while maintaining the observation angle substantially constant, thus, in effect resulting in a change in the region being observed, by changing the focal point of the system.

BRIEF DESCRIPTION OF THE DRAWINGS

The objects and advantages of the invention will become evident and will be understood, from the following description when read in conjunction with the drawings, wherein:

FIGS. 3 and 4 are schematic illustrations showing a source unit and a detector unit at various relative positions.

DESCRIPTION OF THE PREFERRED EMBODIMENTS

Figure 1:
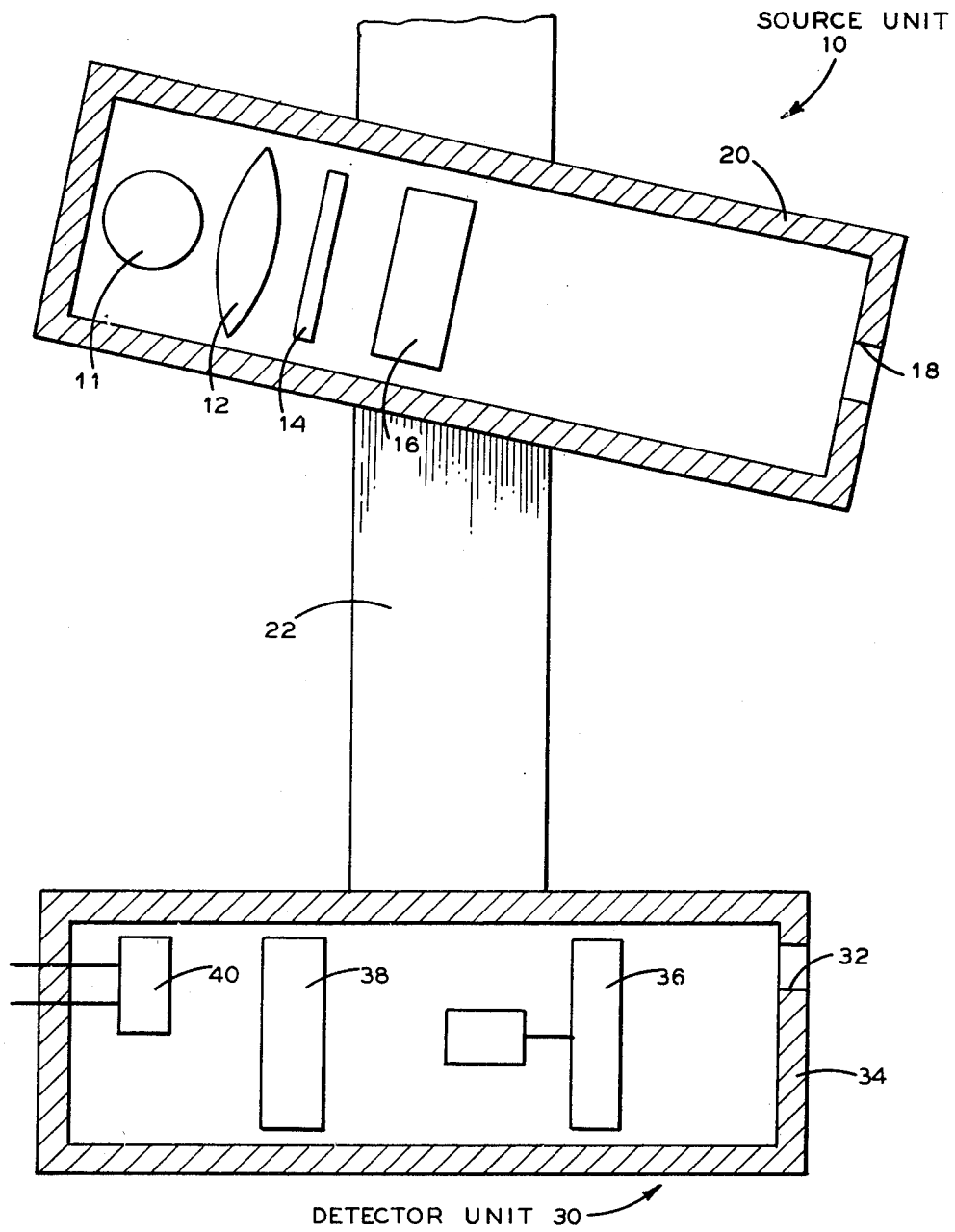
FIG. 1 is a schematic representation of an apparatus in accordance with the present invention.

As shown in FIG. 1, a source unit 10, is mounted on a carrier 22, which is provided with means to permit movement of the source unit 10 along the carrier 22, as will be explained in more detail herein after.

The source unit 10 includes a housing 20, a light source 11, a light filter 14 and a polarizer 16. The light from the source 11, such as a mercury, tungsten, or xenon lamp passes through the monochromatic filter 14, thus limiting the light to a relatively narrow range of wavelengths. Alternatively, the light source can be one which produces only a desired wavelength, or filters can be used in the detector unit 30, to restrict the light to monochromatic light.

It should be understood that the monochromatic light filter can be positioned any where between the light source 11 and the detector 40.

In a system which employs a pair of analyzers and detectors, it is obviously most advantageous to employ the filter between the light source and the sample rather than between the sample and the detector because in the former case only a single filter unit is required, whereas in the latter case, a pair of equivalent units is required. Differences in the light transmission characteristics in the two filter units will introduce errors into the system.

While the use of monochromatic light is preferred, polychromatic light can be used without filtering. Light of multiple wavelength should be smaller or comparable in length to the diameter of the particles being measured in order to produce the best results.

A collimating lens 12, is employed in order to regulate the width of the incident light produced by the light source 12.

After passing through the filter 14, the light is plane-polarized by means of a conventional polarizer 16. Polaroid filters, Nicol, Glan and Rochon prisms are suitable for polarizing the incident radiation.

A variable or fixed exit slit 18 is employed further restricting the width of the incident beam.

A plane-polarized laser beam can be employed in place of the type of system hereto predescribed, for applications in which the distance between the source unit 10 and the region under analysis is very great.

The detector unit 30 includes an entrance slit 32 to the housing 34, a rotatably mounted quartz plate 36, an analyzer 38 and a detector 40. The analyzer 38 permits the passage of light having its axis along a particular plane, either parallel to that of the polarized incident beam or perpendicular thereto, while the detector 40 indicates the intensity of the light passing through the analyzer 38. The quartz plate 36 is employed in order to rotate the plane of the light impringing upon the analyzer 38, in order to permit the same analyzer and detector to be used for determination of both $E_I$ and $E_{II}$.

It should be understood that various other combination of elements can be employed, for example, a pair of detector units can be employed, one for the $E_I$ measurement and the other for the $E_{II}$ measurement, with a beam splitter being used to divide the scattered light into equivalent units. The various combinations are described more fully in copending U.S. patent applications, Ser. No. 629,568, filed Apr. 10, 1967, and Ser. No. 775,093, filed Nov. 13, 1968.

As described in copending U.S. patent application, Ser. No. 774,895, filed Nov. 12, 1968, circularly polarized light can be used in place of plane-polarized light.

Figure 2:
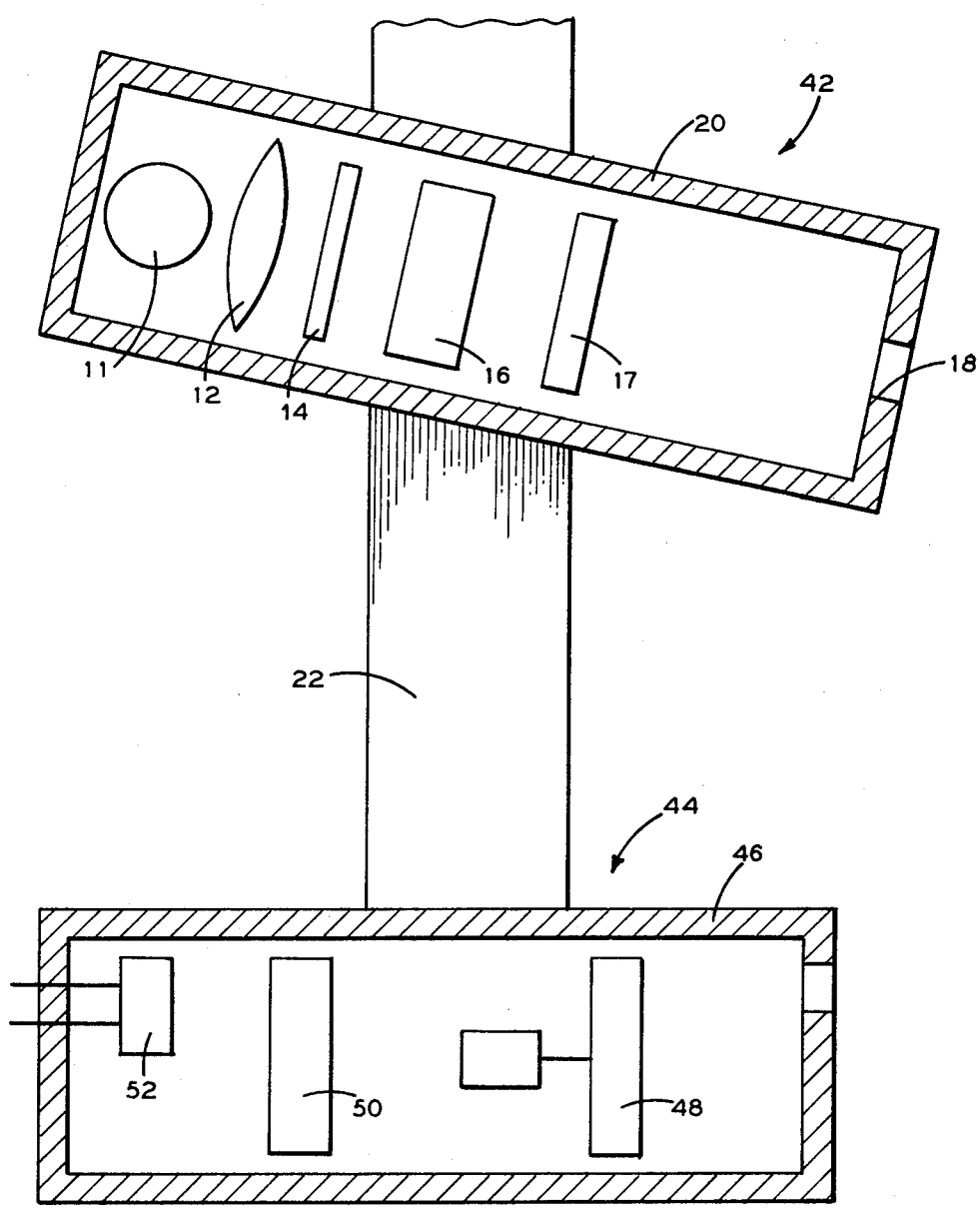
FIG. 2 is a schematic representation of another modification of an apparatus in accordance with the present invention.

As shown in FIG. 2, the source unit 42 contains a light source 11, a collimating lens 12, a filter 14 and a plane polarizer 16, which correspond to the respective elements of the source unit 10, of FIG. 1.

Additionally however, quarter-wave plate 17 is used in order to circularly polarize the light transmitted through the plane polarizer 16. As shown in FIG. 2, the light, which is scattered by the fluid medium under analysis enters the detector 44, and is passed through a quarter-wave plate 48 which is of the same "handedness" as the quarter-wave plate 17. The plate serves to convert the scattered right circularly polarized light (RCPL) to plane polarized light (PPL) whose plane is perpendicular to the plane of the polarized light resulting from the conversion of the left circularly polarized light to plane polarized light. It should be noted that a quarter-wave plate 17 which produces left circularly polarized light can be used just as readily as a plate which produces right circularly polarized light. An analyzer 50, is employed which depending upon its orientation, will either transmit light which is vibrating in a plane parallel or perpendicular to the plane of the incident polarized light from the polarizer 16. The amount of energy of the light which passes through the analyzer 50 is measured by means of a detector 52.

The measurement process is directly related to the process used with plane polarized light as disclosed in copending patent application, Ser. No. 629,568.

As previously noted with regard to the structure of FIG. 1, two simultaneous readings can be taken by employing two equivalent sets of measuring units. Both units must be positioned at the exact same angle $\theta$, from the direction of the source of light. The analyzer of one unit can then be oriented so as to permit the passage of light which is perpendicularly oriented with respect to the plane of the light of the polarizer 16 ($E_I$) while the analyzer of the other unit permits the passage of light which is oriented in a plane parallel with respect to the plane of light from the polarizer 16 ($E_{II}$). The first detector could then measure light which changed from right circularly polarized light to left circularly polarized light as a result of single or primary scattering and one half of the intensity of the light which results from multiple scattering, while the second detector could serve to indicate one half of the intensity of the light which results from multiple scattering.

Inasmuch as differences between the orientation of the two detector units can produce errors and, the necessity to rotate the analyzer 50 or the quarter-wave plate 48 in the system shown in FIG. 2, prevents simultaneous readings of $E_I$ and $E_{II}$, a beam splitter can be employed as shown previously noted with regard to FIG. 1.

A further alternative which can be employed, and is shown in FIG. 1, is to use a member, such as a quartz crystal, which rotates light.

The member can be positioned between the analyzer 50 and the quarter-wave plate 48. With the member in this position, the effect would be to cause a rotation of the light from the quarter-wave plate 48. Removal of the member permits the direct transmittal of the light from the quarter-wave plate 48 to the analyzer 50. In the first case the light whose plane is parallel to the plane of the analyzer 50 is precluded from passing through the analyzer 50 because of the rotation induced by the inserted member. When the member is removed from the position between the quarter-wave plate 48 and the analyzer 50 the light which is in a plane perpendicular to the plane of the analyzer 50 is precluded from passing through the analyzer.

Total scattered radiation is measured by taking a reading with the analyzer 50 (or analyzer 38, in the case of the FIG. 1 structure) removed, so that $E_I$ and $E_{II}$ are received by the detector, simultaneously.

The use of circularly polarized light is more fully described in the previous noted U.S. patent application Ser. No. 774,895, filed Nov. 12, 1968.

The use of circularly polarized light, as compared to plane-polarized light, has the advantage of yielding enhanced sensitivity. Circularly polarized light undergoes a phase change as a result of scattering, whereas plane-polarized light undergoes depolarization.

The operation of the apparatus of the present invention, involves moving the detector unit with respect to the source unit. Obviously, either unit can be fixed on the other unit mounted for accurately controlled, precise movement along the carrier 22.

Since the degree of depolarization changes with changes in the observation angle, it is advantageous to have the moveable member, as for example the source unit 10, of FIG. 1, move without changing its angular relationship to the detector unit.

The well known trigonometric relationship is employed to determine the distance between the source A and the focal point.

Figure 3:
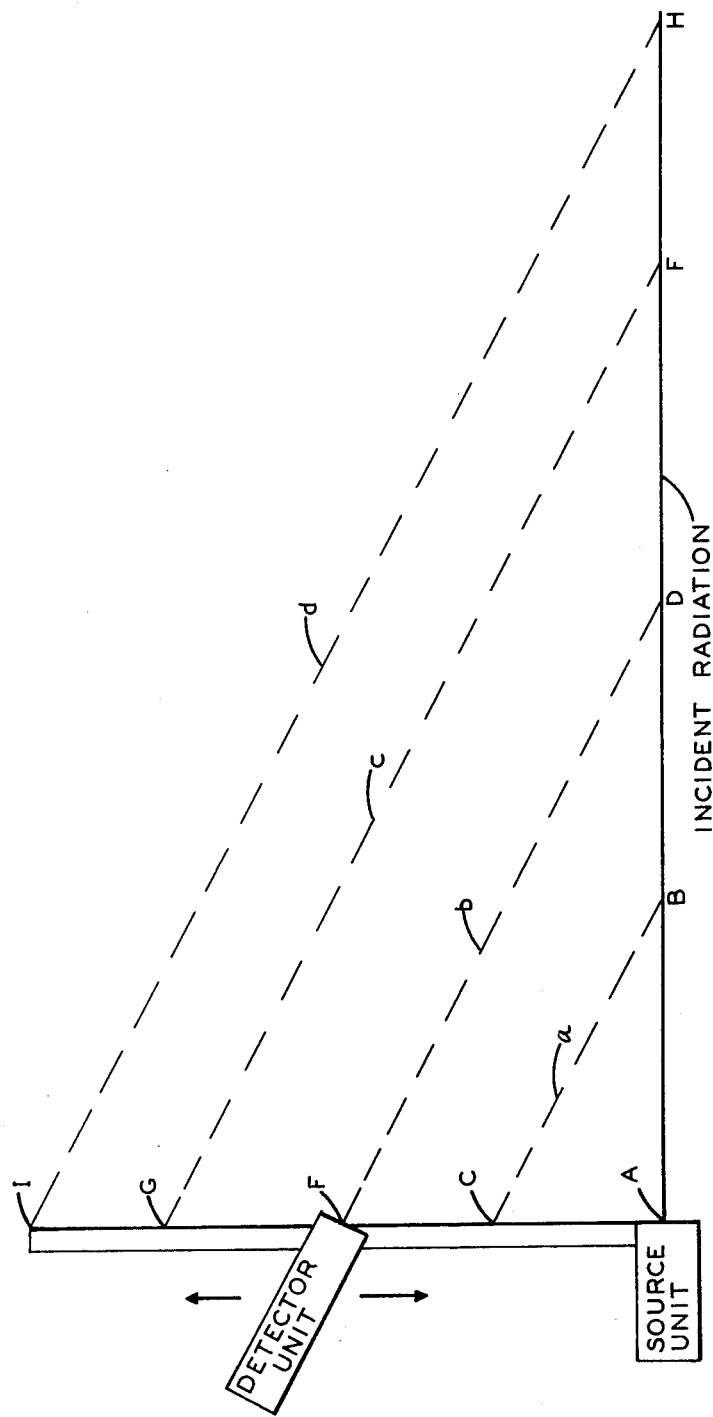

The observation angle $\theta$, can readily be measured as is the case for the varying distance between source A and the detector positions C, E, and G and I. Since Angle $\theta$, remains constant, the focal distances AB, AD, AF and AH as shown in FIG. 3, can be determined directly from the distances AC, AE AG and AI.

It is thus possible to analyze the particle concentration and distribution pattern of a region at various known distances.

As shown in FIG. III, an incident beam, A, of polarized light is aimed at a region B to be analyzed by a detector C.

A plurality of parallel paths of backscattered light are represented by the designations $a$, $b$, $c$, and $d$.

If the region between the light source A and the point B is substantially particle free, the observed degree of depolarization will be virtually zero. When the detector is position such that it observes or responds to light traveling along the path B, from point D, a particular degree of depolarization will be noted, depending upon the particle concentration between points B and D. In a system in which the particle concentration between points B and C is equal to the concentration between points D and F, a corresponding increase in the degree of depolarization will be observed as a result of the increase in the number of particles between the light source A and the focal point F.

In a system in which the region between focal points F and H is substantially particle free, no further change in the degree of depolarization will be noted since the same total number of particles are interacting.

In another application, the system of the instant invention can be used to observe and analyze the amount or concentration of solid particles being emitted from smoke stacks. The system is capable of differentiating between the smoke eminating from several relatively closely located stacks.

FIG. 4 shows the structure of FIG. 1, employed in the analysis of three clouds of smoke 53, 54, and 56. Depolarization or concentration measurements are taken, as previously noted, for the cloud 53.

Readings for the cloud 54 are in effect taken through the first cloud 53 and the particle concentration of the first cloud must be taken into account.

The structure may be pivotally mounted so that the entire assembly can be rotated without affecting the angular relationship between the source unit 10 and the detector unit 30. In the way a third cloud of smoke 56 can be analyzed for particle concentration. It should be noted, that while for convenience a right-angle relationship between the carrier member 22 and the detector 30 is shown to exist, and that the detector is shown as being fixed in place, which the source unit is moveable, it is apparent that any convenient angular relationship can be employed and that either unit can be moveable.

Although the invention has been described in its preferred forms with a certain degree of particularlity, it is understood that the present disclosure of the preferred forms has been made only by way of example, and that numerous changes in the details of construction and the combination and arrangement of parts may be resorted to without departing from the spirit and the scope of the invention.

GLOSSARY OF TERMS

Back Scattering—The phenomena of the light having its direction of travel changed by more than 90° from the direction of travel of the incident light.

Multiple Scattering—The scattering of light by a plurality of particles so that the light changes its direction of travel more than once.

Primary Scattering—The scattering of light off a single particle so that the direction of travel is changed only once.

Analyzer—A device, such as a polarizer prism or a polarizing filter which can isolate the component in scattered light vibrating either parallel or perpendicular to the axis of the polarized light. A polarizer prism functions by absorbing the undesired light.

Detector—A device which is used in measuring the intensity of light transmitted from the analyzer. A photocel or photomultiplier can be used.

Quarter Wave Plate—A device which can convert plane polarized light into either right or left polarized light or right or left circularly polarized light into plane-polarized light.

Light—A form of radiant energy, which include ultraviolet, visible and infrared radiation.

$E_{11}$—The intensity of the component of light having its optical axis parallel to the axis of the incident polarized light.

$E_1$—The intensity of the component of light having its optical axis perpendicular to the axis of the incident polarized light.

$E_T$—Intensity of the total scattered light ($E_{11}+E_1$).

Degree of Depolarization—Typically refers to the ratio of $E_1/E_{11}$, although other ratios can be used.

$E_{Polarized}$—Intensity of plane polarized light. ($E_{11}-E_1$)

$E_{Depolarized}$—Intensity of depolarized light ($2 \times E_1$)

$E_{Multiple}$—Intensity of circularly polarized light which has undergone primary scattering $E_{Primary}$—Intensity of circularly polarized light which has undergone primary scattering.

Observation Angle—The angle formed by the path of the incident polarized light and the scattered light which is being observed: Light which is transmitted directly through a medium would be observed at an angle of 0°, while the angle for light which is back scattered to the maximum extent is 180°.

Suspended Solids—Any coherent particles, liquid, solid or gaseous bubbles, which are suspended in a fluid or vacuum, provided there is a difference between the refractive index of the particles and the fluid.

The phraseology, and definitions employed herein, are for the purposes of description and enhancing the understanding of the invention rather than for the purpose of establishing limitations of the invention.

What is claimed is:

1. Apparatus for use in remotely detecting particles located at various regions in a fluid, comprising:

light source means for producing an incident beam of polarized light;

analyzer means for isolating polarized and depolarized components in light backscattered by particles in said fluid;

detector means for detecting said isolated components of light backscattered by particles in said fluid;

support means for supporting said source means and said detector means with a fixed angular relationship between the path of said incident beam of polarized light from said source means and the path of backscattered light to said detector means;

said source means being moveable with respect to said detector means such that the distance between said source means and said detector means is variable and the angular relationship between said source means and said detector means is constant;

means for utilizing the output of the detector means as an indication of the degree of depolarization of said backscattered light.

2. The apparatus of claim 1, further comprising means in association with said light source means for circularly polarizing the incident beam of polarized light, and means in association with said analyzer means for converting backscattered circularly polarized light to plane polarized light.

3. Apparatus of claim 1, further comprising means to rotate 90°, the plane of the light received by said detector means.

4. The apparatus of claim 1, wherein the angular relationship between said light source means and said detector means is fixed at an angle greater than 150°.

5. The apparatus of claim 2, wherein the angular relationship between said light source means and said detector means is fixed at an angle greater than 150°.

6. The method of determining the concentration of particles suspended in various regions in a fluid sample, comprising the steps of:

a. projecting into said fluid medium an incident beam of polarized light having a first plane of polarization, whereby light will be backscattered by particles in said fluid medium, said backscattered light having a first component having its plane of polarization parallel to said first plane of polarization of said incident beam of polarized light and a second component having its plane of polarization perpendicular to said first plane of polarization of the incident beam of polarized light;

b. measuring the intensity of said first component and said second component of said backscattered light at a plurality of points in said fluid medium to produce a plurality of respective first and second measuring signals, each of the measurements being taken at substantially the same predetermined backscattering angle;

c. forming a plurality of ratios of said respective first and second measuring signals: whereby each of said ratios indicate the concentration of suspended particles at corresponding points in said fluid medium.

7. Method of claim 6 further comprising a step of circularly polarizing the incident beam of polarized light of step (a) whereby the backscattered light includes circularly polarized light components, and wherein the step of measuring includes the step of converting the backscattered circularly polarized light components to plane-polarized light.

8. The method of claim 6 wherein said step of measuring comprises measuring the first and second components of backscattered light at a predetermined backscattering angle greater than 150° with respect to the direction of travel of the incident polarized light from projected to the fluid being analyzed.

* * * * *